UNITED STATES PATENT OFFICE.

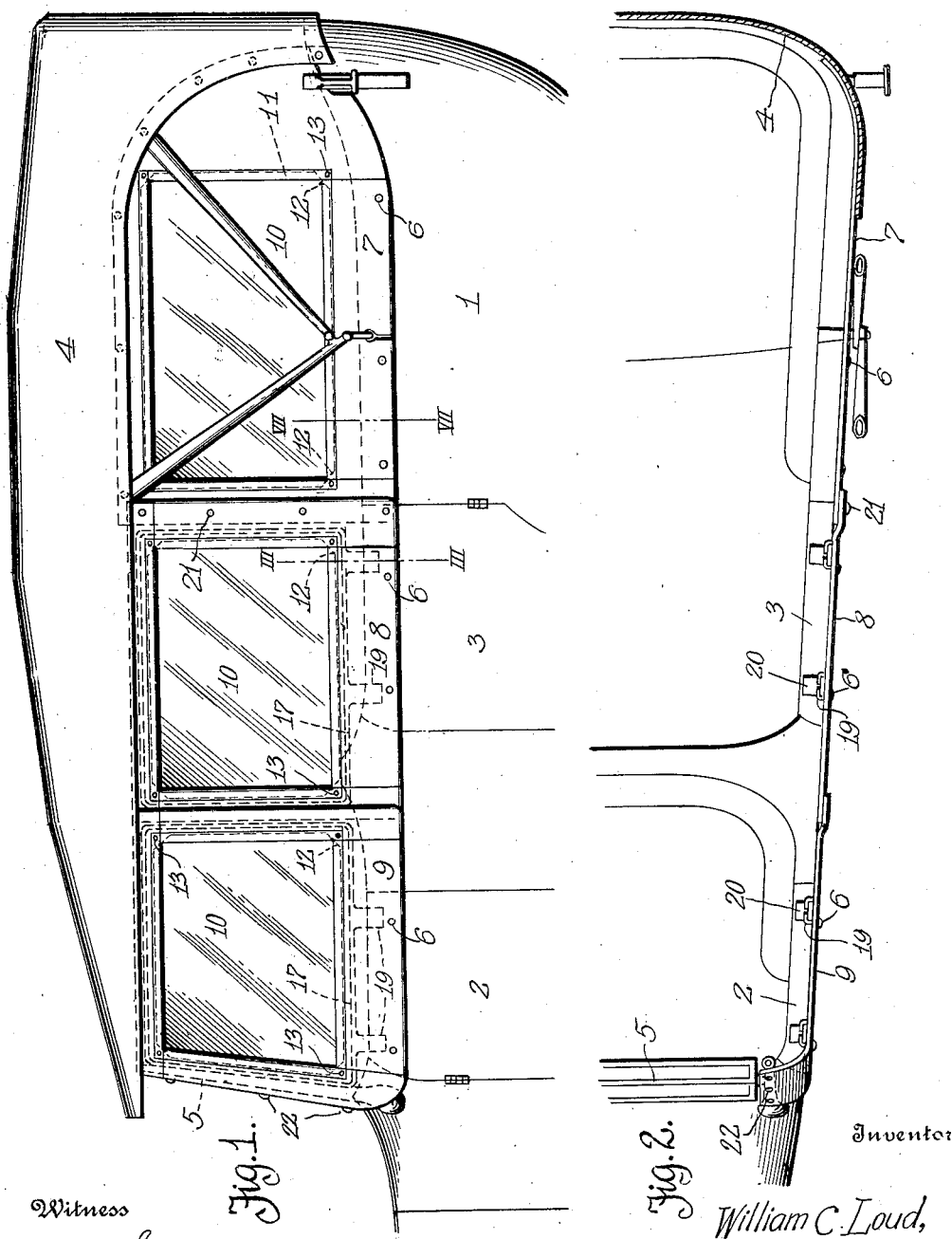

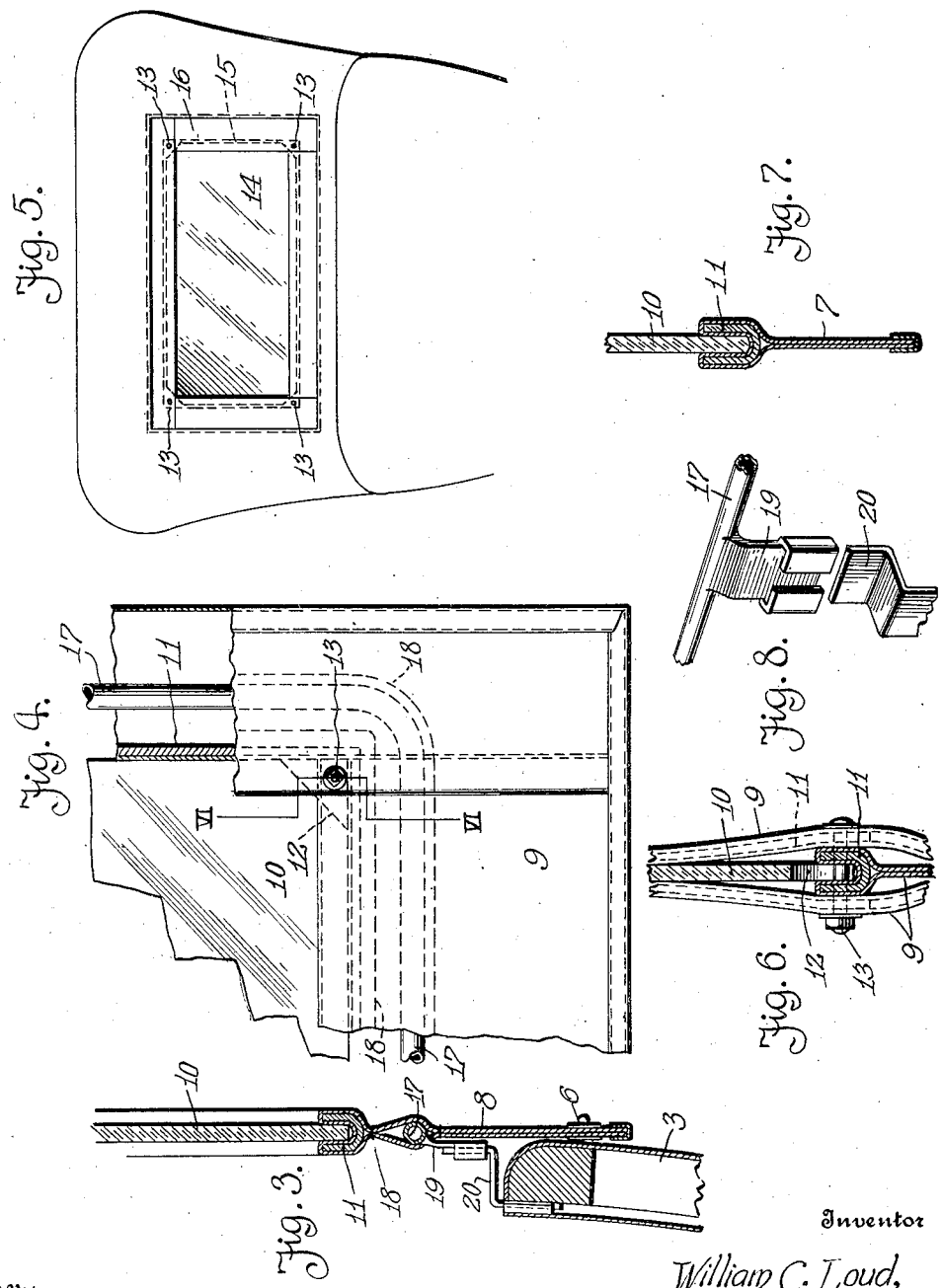

WILLIAM C. LOUD, OF DETROIT, MICHIGAN.

AUTOMOBILE CURTAIN OR PANEL.

1,355,558.   Specification of Letters Patent.   Patented Oct. 12, 1920.

Application filed August 19, 1918. Serial No. 250,444.

*To all whom it may concern:*

Be it known that I, WILLIAM C. LOUD, a citizen of the United States of America, residing at Detroit, in the county of Wayne and State of Michigan, have invented certain new and useful Improvements in Automobile Curtains or Panels, of which the following is a specification, reference being had therein to the accompanying drawings.

The primary object of my invention is to provide an automobile curtain or panel which, when used with similar curtains or panels as the parts of an automobile top in providing an inclosure for the occupants of an automobile, will possess the same advantages as a rigid top or inclosure for an automobile, in having a large and unobstructed window light or transparent section for observation purposes by the occupants of the automobile, besides enhancing the general appearance of the automobile compared to the usual curtain having celluloid panels which are small, wrinkled and in a great many instances broken.

Another object of my invention is to provide a side automobile curtain or panel which may be rigidly and safely supported by the door of the automobile body, without danger of the curtain panel becoming incidentally displaced or the transparent portion thereof being broken, either during the operation of the door or the automobile.

Another object of my invention is the provision of positive and reliable means, in a manner as hereinafter set forth, for holding a pane of glass in engagement with an automobile curtain or panel, the pane of glass being supported or yieldably held in a frame constituting a rigid structure for the curtain or panel and by which the curtain or panel may be held in a useful position relative to the door of an automobile body.

A still further object of my invention is to accomplish the above results by a simple, durable and inexpensive construction that will be hereinafter described and then claimed, and reference will now be had to the drawings, wherein—

Figure 1 is a side elevation of a portion of an automobile body showing the top thereof raised, and the side curtains in position;

Fig. 2 is a horizontal sectional view of a portion of the frame;

Fig. 3 is an enlarged cross sectional view taken on the line III—III of Fig. 1;

Fig. 4 is an enlarged side elevation of a portion of a curtain or panel, partly broken away and partly in section;

Fig. 5 is a rear elevation of an automobile top provided with a window light in accordance with my invention;

Fig. 6 is an enlarged vertical sectional view taken on the line VI—VI of Fig. 4;

Fig. 7 is a similar view taken on the line VII—VII of Fig. 1; and

Fig. 8 is a perspective view of a portion of a door bracket and a portion of a rigid frame adapted to form part of the curtain or panel.

In the drawings, the reference numeral 1 denotes a portion of an automobile body having hinged doors 2 and 3, a top 4 and a windshield 5, said elements being provided with the usual and well known type of turn buttons or snap fasteners 6 by which side curtains may be attached to the body, windshield and top so as to coöperate with the windshield and top in providing an inclosure for the body 1. The side curtains are generally designated 7, 8 and 9, and the body of each curtain is made of flexible waterproof material. Considering the curtains 7 which are connected to the body 1 and the top 4, each curtain has a transparent panel 10 that may be of thin glass or any suitable grade of glass such as used for window lights.

The panel 10 is held by a metallic frame 11 composed of channel bars into which the edges of the panels extend, said panels having the corners cut away, as at 12, so as to provide clearance for bolts, rivets, or other fastening means, indicated at 13, and employed for connecting the ends of the channel bars composing the metallic frame 11. The ends of some of the channel bars can be contracted to fit in the ends of other channel bars, and thus place all of the bars of the metallic frame in a common plane.

Prior to mounting the panel 10 in the frame 11, the cloth or fabric from which the curtain 7 is made is carried into each bar of the metallic frame 11, as clearly shown in Fig. 7, the cloth or fabric within the channel frame serving as a cushion or packing for the edges of the panel. This can be readily accomplished particularly when the curtain is made of two plies of material stitched or otherwise connected together, at suitable places, and the edges of the curtain provided with a binding, as is the usual practice. Since the panel is set in from the marginal edges of the curtain and the curtain connected to the top and body of the automobile, it is apparent that the glass panel is safely supported and may be of a size approximately the entire area of the curtain, thus permitting plenty of light to enter the interior of the automobile and permitting occupants therein to readily make observations.

A panel 14 constructed somewhat similar to the panel 10 is placed in the back of the top 4, the panel 14 having a metallic panel frame 15, similar to the frame 11 and a cloth frame 16 similar to the material bordering on the panel 10. With the cloth frame 16 stitched or otherwise connected to the fabric of the top 4, the panel 14 will be safely supported and may be of large size.

The curtains 8 and 9 are constructed somewhat similar to the curtain 7, with the following exception. Between the plies of cloth forming the curtains 8 and 9 is placed a tubular frame 17 of greater area than the metallic channel frame and the cloth, at both sides of the tubular frame is stitched together, as at 18, so that the cloth curtain is positively held by the tubular frame and in consequence of this arrangement the transparent panel is yieldably held in spaced relation to the tubular frame 17 and cannot contact therewith.

Each tubular frame has depending socket members 19 extending out of the cloth curtain, as best shown in Fig. 9, so as to fit over detachable angle brackets 20 suitably mounted in the upper edges of the doors 2 and 3. The angle brackets 20, socket members 19 and tubular frame 17 constitute rigid means for supporting the side curtains 8 and 9 on the hinged doors 2 and 3 and said doors may be readily opened and closed without any danger of the side curtains collapsing.

The side curtains 8 have buttons or other attaching means 21 so that when the doors 2 are closed, the curtains 8 may be connected to the forward edges of the curtains 7, and the front curtains 9 are of such a shape as to extend on to the windshield 5 and be connected thereto, as at 22.

In Fig. 3 the manner in which the tubular frame 17 is held in the cloth curtain has been clearly shown, and in Fig. 6, the manner in which some of the bars of the metallic frame 15 have been spread or contracted to receive other bars is clearly shown, and in referring to these frames as being tubular and channel shaped, such construction is preferable although frames of other cross sectional area may be provided to serve the same purpose.

In making the cloth frames, that is, the yieldable or flexible fabric between the glass and the tubular frame 17, it is preferable to make the same of strips as brought out in Fig. 5, therefore it is possible to remove the top or bottom strip, particularly the latter when it is necessary to replace a broken pane of glass. The strips of fabric also facilitate laying the fabric into the metallic bars of the frame 15, and such construction is an advantage from a manufacturing standpoint. Furthermore, such construction permits of extremely thin window glass being used in contradistinction to heavy plate glass, consequently a curtain in accordance with my invention is extremely light in weight.

The curtains when not in use may be suitably stored in or about the automobile.

What I claim is:—

1. An automobile curtain comprising a cloth body having an opening, a supporting member intermediate the marginal and opening edges of said cloth body, a channel frame at the edges of the body opening and into which the cloth of said body extends, and a transparent panel having its edges cushioned in the channel frame by the cloth body of said curtain.

2. The combination of an automobile door, a member rigidly held thereby, a frame adjacent said member, a plate of glass in said frame, and a piece of cloth inclosing said member and frame with a portion of the cloth providing a yieldable connection between said frame and said member, and maintaining said frame in spaced relation to said member, said piece of cloth having an edge parallel to said member and adapted for connection to said door.

3. The combination of a rectangular cloth frame, a channel frame in said cloth frame, a rectangular metal frame set in from the edges of said cloth frame in spaced relation to said channel frame, supporting means for said metal frame at the bottom thereof, and a rectangular transparent plate in said channel frame and having its corners cut away to provide clearance for the connecting means between said cloth and channel frames.

4. The combination as set forth in claim 3 wherein said means is in the form of brackets for supporting the metal frame.

In testimony whereof I affix my signature in the presence of two witnesses.

WILLIAM C. LOUD.

Witnesses:
   Anna M. Dorr,
   Karl H. Butler.